(12) United States Patent
Al-Hallaj et al.

(10) Patent No.: US 12,422,195 B2
(45) Date of Patent: Sep. 23, 2025

(54) SMART PHASE CHANGE COMPOSITE FOR PASSIVE THERMAL MANAGEMENT

(71) Applicant: BEAM GLOBAL, San Diego, CA (US)

(72) Inventors: Said Al-Hallaj, Chicago, IL (US); Stoyan Stoyanov, Chicago, IL (US); Hexu Wang, Chicago, IL (US); Samuel T. Plunkett, Chicago, IL (US); Scott Morehouse, Hudsonville, MI (US); Panos Prezas, Chicago, IL (US)

(73) Assignee: BEAM GLOBAL, San Diego, CA (US)

( * ) Notice: Subject to any disclaimer, the term of this patent is extended or adjusted under 35 U.S.C. 154(b) by 0 days.

(21) Appl. No.: 17/751,915

(22) Filed: May 24, 2022

(65) Prior Publication Data

US 2022/0373268 A1 Nov. 24, 2022

Related U.S. Application Data

(60) Provisional application No. 63/192,340, filed on May 24, 2021.

(51) Int. Cl.
*F28D 20/02* (2006.01)
*F28D 20/00* (2006.01)
(Continued)

(52) U.S. Cl.
CPC ......... *F28D 20/023* (2013.01); *F28D 20/025* (2013.01); *H01M 10/613* (2015.04); *H01M 10/659* (2015.04); *F28D 2020/0008* (2013.01)

(58) Field of Classification Search
CPC ............... F28D 20/023; F28D 20/025; F28D 2020/0008; F28D 2020/0013;
(Continued)

(56) References Cited

U.S. PATENT DOCUMENTS 4,781,243 A * 11/1988 DeVogel ............. H05B 6/6494
165/47
6,397,618 B1 * 6/2002 Chu .................... F28D 15/0275
257/E23.088
(Continued)

FOREIGN PATENT DOCUMENTS

CN  201252709 Y * 6/2009
KR  101865944 B1 * 5/2012
WO  WO 2020/197982 A1  10/2020

OTHER PUBLICATIONS

CN201252709Y Machine Translation (Year: 2009).*

*Primary Examiner* — Len Tran
*Assistant Examiner* — Gustavo A Hincapie Serna
(74) *Attorney, Agent, or Firm* — Pauley Erickson & Swanson

(57) ABSTRACT

A thermal management apparatus and method of use, such as in a battery pack or electronic device. A thermally responsive material is disposed between two surfaces, wherein the thermally responsive material changes upon heating, to increase a thermal conductance between the two surfaces. The thermally responsive material is offset from one of the surfaces and expands upon heating to connect the two surfaces. The thermally responsive material is a phase change composite including a phase change material selected from a paraffin wax, a hydrated salt, and combinations thereof.

17 Claims, 12 Drawing Sheets

(51) Int. Cl.
  *H01M 10/613* (2014.01)
  *H01M 10/659* (2014.01)

(58) Field of Classification Search
  CPC ............ H01M 10/613; H01M 10/659; H01M 10/617; H01M 10/625; H01M 10/643; H01M 10/647; H01M 10/653; H01M 10/6551; H01M 10/6555; H01M 10/6557; H01M 50/213
  USPC ........................................................ 165/209
  See application file for complete search history.

(56) References Cited

U.S. PATENT DOCUMENTS

| | | | | |
|---|---|---|---|---|
| 6,959,753 | B1* | 11/2005 | Weber | H01L 23/3733 165/905 |
| 10,043,732 | B1* | 8/2018 | Al Omari | H01L 23/3736 |
| 2003/0194537 | A1 | 10/2003 | Bhagwagar et al. | |
| 2003/0211384 | A1* | 11/2003 | Hamada | H01M 50/209 429/120 |
| 2014/0079978 | A1* | 3/2014 | Al-Hallaj | H01M 10/6552 429/120 |
| 2016/0104925 | A1* | 4/2016 | Xiang | H01M 10/6551 429/82 |
| 2016/0201995 | A1* | 7/2016 | Oliva Llena | F28F 21/04 165/10 |
| 2016/0226042 | A1 | 8/2016 | Hartmann et al. | |
| 2016/0319174 | A1 | 11/2016 | Razack et al. | |
| 2017/0149103 | A1* | 5/2017 | Yang | H01M 10/6556 |
| 2017/0181318 | A1* | 6/2017 | Soupremanien | H01L 23/4275 |
| 2019/0110356 | A1* | 4/2019 | Silvano De Sousa | H01L 23/3736 |
| 2019/0257590 | A1* | 8/2019 | Liu | F28D 15/046 |
| 2019/0368822 | A1* | 12/2019 | Hofacker | H05K 7/20936 |
| 2019/0393576 | A1* | 12/2019 | Sunada | H01M 10/6554 |
| 2020/0106143 | A1* | 4/2020 | Juzkow | H01M 10/659 |
| 2020/0109901 | A1* | 4/2020 | Mayberry | F28D 20/028 |
| 2020/0132392 | A1* | 4/2020 | Joshi | H05K 7/2039 |
| 2020/0152541 | A1* | 5/2020 | Engelhardt | H01L 23/367 |
| 2020/0235446 | A1* | 7/2020 | Ai-Hallaj | H01M 10/651 |
| 2020/0274212 | A1* | 8/2020 | Mo | H01M 50/213 |
| 2020/0325075 | A1* | 10/2020 | Pawlik | C04B 38/0003 |
| 2020/0400386 | A1* | 12/2020 | Miers | H01L 23/367 |
| 2021/0075076 | A1* | 3/2021 | Kato | H01M 10/617 |
| 2022/0158273 | A1* | 5/2022 | Khateeb Razack | H01M 10/617 |
| 2022/0228815 | A1* | 7/2022 | Vesin | F28D 20/021 |
| 2022/0231352 | A1* | 7/2022 | Xiang | H01M 10/653 |
| 2022/0271089 | A1* | 8/2022 | Tong | H10N 70/8825 |
| 2023/0023819 | A1* | 1/2023 | Sawafta | H05K 7/2029 |
| 2023/0221081 | A1* | 7/2023 | Vesin | F28D 20/021 165/10 |
| 2023/0261308 | A1* | 8/2023 | Pannala | H01M 10/0525 429/72 |

* cited by examiner

SMART PHASE CHANGE COMPOSITE FOR PASSIVE THERMAL MANAGEMENT

CROSS REFERENCE TO RELATED APPLICATION

This application claims the benefit of U.S. Provisional Application Ser. No. 63/192,340, filed on 24 May 2021. The provisional application is hereby incorporated by reference herein in its entirety and is made a part hereof, including but not limited to those portions which specifically appear hereinafter.

FIELD OF THE INVENTION

This invention relates generally to removing operational heat from electronic devices or battery packs and, more particularly, to phase change composite structures for temperature regulation in such devices or battery packs, and methods of manufacturing and use of said phase change composite structures, such as for removing excess heat generation.

BACKGROUND OF THE INVENTION

Temperature regulation is important for battery packs and other heat generating devices, such as electronic devices or motors. Uses of phase change materials, such as wax, are known to store and release heat. The phase change materials are known to be supported by matrix materials, such as an encapsulated wax or salt hydrate material in a graphite matrix. There is a continuing need for improved battery systems, and improved temperature regulation materials.

SUMMARY OF THE INVENTION

A general object of the invention is to improve removal of operational heat from a heat source, such as a battery pack or electronic device.

The present invention includes or provides a passive thermal management apparatus, such as is usable with any heat source, for example, a battery pack, an electronic device (e.g., computer), an electric motor, etc. The passive thermal management system of embodiments of this invention acts as a thermal switch for activating increased heat transfer from the heat source to a conductive element. The passive thermal management system includes a thermally responsive material that expands upon absorbing thermal energy from the heat source, until it contacts a further thermal conductor to amplify energy thermal transfer away from the heat source. In other embodiments of this invention, the thermally responsive material is additionally electrically conductive, to further result in an electrical connection upon expansion to a secondary element/surface.

The thermal management apparatus of embodiments of this invention can be considered a "smart" thermal switch for "passive" thermal management. The thermal switch is "smart" in that it can be designed to activate upon reaching a defined heat level within the adjacent heat source. The provided thermal management is "passive" in that there is no required active cooling such as using air or liquid to move the heat, nor active management by a sensor, processor, etc.

The general object of the invention can be attained, at least in part, through a thermal management apparatus including a thermally responsive material disposed between two surfaces. The thermally responsive material changes upon heating, to increase a thermal conductance between the two surfaces, which are desirably thermally conductive plates or walls of other components of the heat source assembly. The thermally responsive material can be embodied as a film, a plate, a block, or an array of individual material components between the two surfaces. The thermally responsive material preferably changes from thermally insulating to thermally conductive upon the heating.

In embodiments of this invention, the thermally responsive material is offset from a first of the surfaces and expands upon heating to connect the two surfaces. The thermally responsive material is preferably in contact with the second surface, which is the surface disposed toward or adjacent the heat source.

In embodiments of this invention, the thermally responsive material includes a phase change material disposed between the two surfaces. The phase change material can be contained in a composite matrix material (e.g., graphite), and can be any suitable material, such as a paraffin wax, a hydrated salt, and combinations thereof.

Embodiments of this invention include a support structure to contain and secure the thermally responsive material, as well as direct the expansion direction. The support structure desirably includes a plurality of cavities or cells, each enclosing an amount of the thermally responsive material. The cavities or cells preferably have a cross-sectional shape selected from a circle, a square, a triangle, a hexagon, and combinations thereof.

The invention further includes a thermal management apparatus including a support structure with a plurality of cavities or cells, each of the cavities or cells extending from a first end to a second end. A phase change composite, such as described above, disposed in each of the plurality of cavities or cells, preferably in a lattice or honeycomb array, wherein the phase change composite is offset by a predetermined distance from the second end, and the phase change composite is configured to expand toward the second end upon a sufficient heat at the first end. A thermally conductive surface is desirably over the second end. In embodiments of this invention, the first end is disposed toward and/or against a heat source, and the second end is disposed toward an active or passive cooling plate or channel.

The invention further includes thermal management apparatus with a support structure including a lattice or honeycomb of a plurality of cavities or cells. The support structure has a first side configured to be disposed toward or against a heat source, and a second side opposite the first side, with each of the cavities or cells extending from a first open end on the first side of the support structure to a second open end on the second side of the support structure. A phase change composite is disposed in each of the plurality of cavities or cells. A conductive surface is over the second open end of the each of the cavities or cells, wherein the phase change composite in the each of the plurality of cavities or cells is offset by a predetermined distance from the conductive surface. The phase change composite is configured to expand toward the conductive surface upon a sufficient heat at the first side of the support structure.

The phase change composite can be a loose fill of phase change material or include a matrix material of graphite including the phase change material, such as selected from a paraffin wax, a hydrated salt, and combinations thereof.

In embodiment of this invention, the heat source is a battery pack of a plurality of electrochemical cells. A conductive surface is over the first open end of the each of the cavities or cells. The conductive surface desirably being, or adjacent to, a housing wall for the heat source or a cooling channel or other structure (e.g., cooling fins).

The invention further includes a method of making a thermal management apparatus as discussed herein. The method includes forming a phase change composite and inserting the phase change composite into a cell or cavity of a support structure, wherein the composite is offset from at least one end of the cell or cavity.

The invention further includes a method of use of a thermal management apparatus as discussed herein. The method includes placing a first end of the thermal management apparatus toward or against a heat source and a second end toward or against a heat dissipating surface. A thermally responsive material within the thermal management apparatus changes (e.g., expands) upon heating to increase a thermal conductance between the heat source and the heat dissipating surface.

Other objects and advantages will be apparent to those skilled in the art from the following detailed description taken in conjunction with the appended claims and drawings.

DESCRIPTION OF THE INVENTION

The invention will be described below as a passive thermal management system or thermal switch for activating increased heat transfer from a battery pack to a conductive element. The invention also can be used with other heat sources, such as electronic or motor components.

In embodiments of this invention, a thermal management apparatus includes a phase change composite disposed between two surfaces, wherein the phase change composite is offset from one of the surfaces and expands upon heating to connect the two surfaces. The other surface can be adjacent, such as against or part of, a heat source. The expanded PCC 'bridge' between the two surface allows for greatly increased thermal conductivity, for moving thermal energy from the heat source. The invention thus acts as a "smart" thermal switch in that it can be designed to activate upon reaching a defined heat level within the adjacent heat source.

Embodiments of this invention include a support structure for containing a phase change composite material. The phase change composite (PCC) material provides the thermal switch function, in that the PCC expands upon absorbing heat to contact a further conductive element, with such contact providing ("switching on") a large increase in heat transfer.

The support structure of embodiments of this invention includes one or more open cells or cavities for containing the thermal (or electrical) regulation material. The regulation material is offset a predetermined distance (e.g., up to a few millimeters) from one end of the support structure, and expands to reach the end upon a sufficient thermal change in the heat source (e.g., an overheating event).

Figure 1:
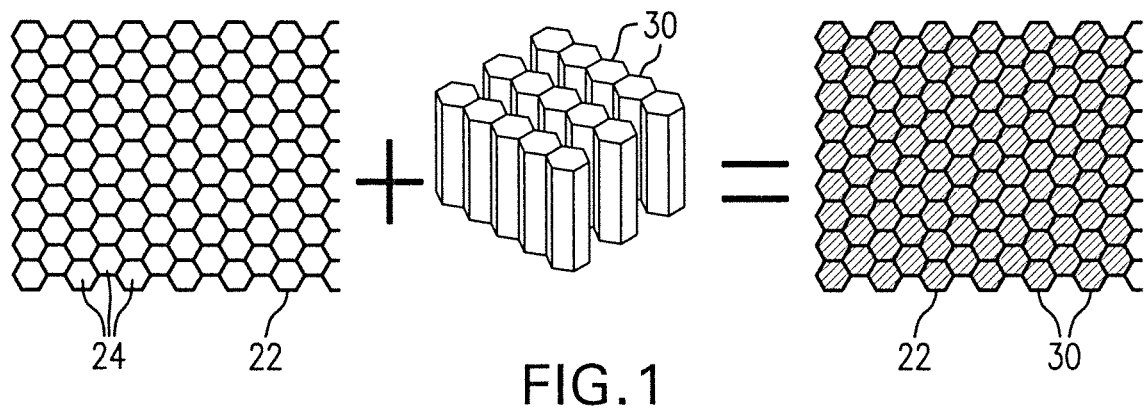
FIG. 1 describes an assembly of a thermal management apparatus according to one embodiment of this invention.
Figure 2:
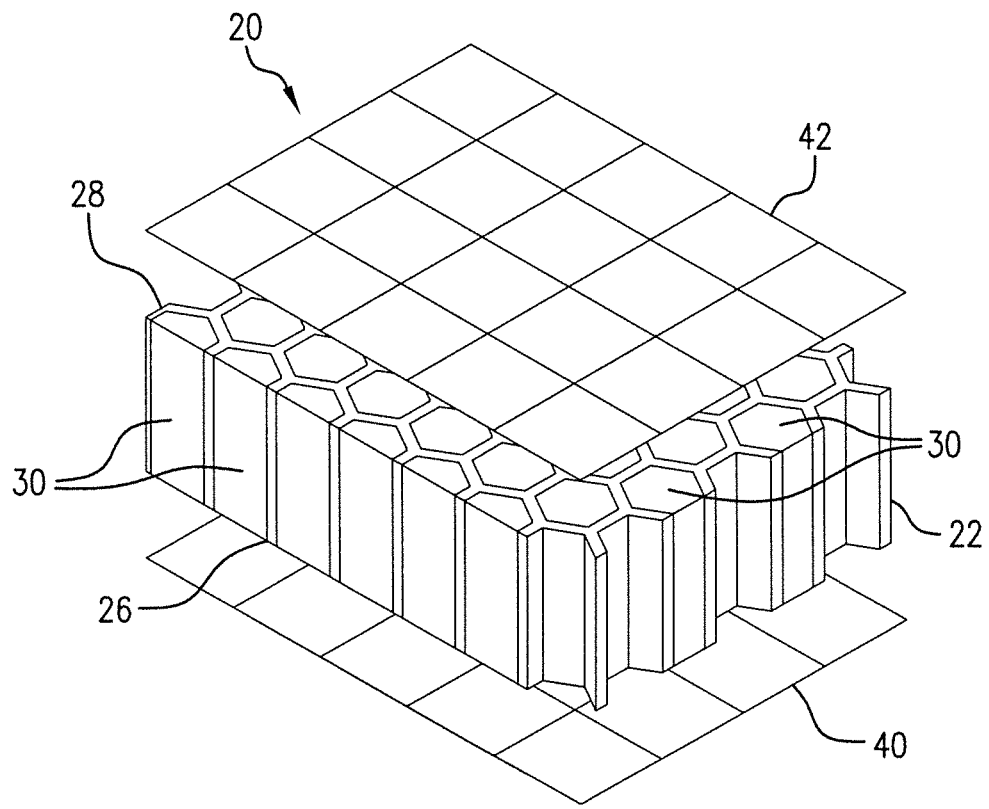
FIG. 2 shows an exploded, sectional view of the thermal management apparatus of FIG. 1 between two surfaces.
Figure 3:
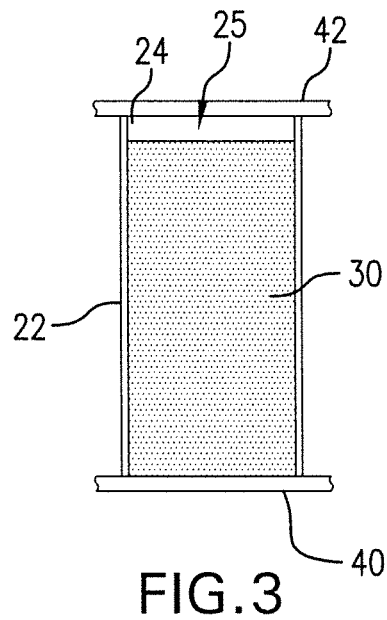
FIG. 3 shows a sectional view of a cell or cavity of the thermal management apparatus of FIGS. 1 and 2.

FIGS. 1-3 show a thermal management apparatus 20 according to one embodiment of this invention. The support structure is a honeycomb lattice support structure 22 of a plurality of cavities or cells 24. Each of the cavities or cells 24 extend from a first open end 26 to a second open end 28. The support structure 22 is desirably made of a non-conductive material, such as plastic or ceramic, etc., that does not grow/shrink under operation conditions. As will be appreciated, the size, shape, and configuration of the support structure and the individual cavities/cells can vary, depending on need. For example, one or both ends can be closed by a conductive material, such as a thin metal foil, such as for ease of manufacturing/installation.

A temperature regulation material, desirably a phase change material (PCM) or phase change composite (PCC) 30, is disposed in each of the plurality of cavities or cells 24. As shown in FIG. 1m the PCM or PCC 30 is added to each cavity or cell 24, such as in a preformed PCC of a matching or coordinating shape and configuration. As shown in FIG. 3, an end of the PCC 30 is offset by a predetermined distance 25 from the second end 28. The PCC 30 can be, for example, a loose fill packed into the cavities or cells 24, a preformed PCC that fits into the cavities or cells 24, or a combination of both.

In embodiments of this invention, the phase change composite includes a phase change material interspersed in a base matrix material. As an example, a graphite matrix material is impregnated with a phase change material, such as wax. The impregnation is performed, for example, by soaking the graphite sheet or block in a liquid wax bath for a necessary time, followed by any necessary cooling/solidifying of the wax. Other methods of impregnation can be used, such as spraying or mixing the phase change material with the graphite in the sheet or block forming process. The sheet or block can be machined to the desired shape before or after the impregnating.

Suitable phase change materials for use in Li-ion battery applications desirably will have a melting point in the range of between about 30° C. and 60° C., a high latent heat per unit mass ratio, and a narrow melting temperature range. Further, phase change materials for use in the practice of the invention will also desirably be thermally cyclable, non-hazardous, non-contaminant, non-reactive or otherwise inert with respect to other battery components, nontoxic, cheap and of relatively light weight or density. Thus, suitable such phase change materials may generally include paraffin waxes such as are relatively inexpensive, not easily or prone to decomposition and which generally have a relatively low melting temperature within the recommended range of operation for Li-ion cells. Other possible or suitable phase change materials for such applications may include stearic acid which has a melting point of about 70° C., and various commercially available esters of stearic acid with methyl, propyl and butyl alcohols, having melting points in the range of about 17° C. to about 34° C. Another candidate phase change material for use in the practice of the invention is polyethylene glycol (PEG). Nonorganic phase change material such hydrated salts with similar melting temperature range (i.e. 30-60° C.) are also a good candidate for this application. Further discussion on suitable phase change materials can be found in U.S. Pat. No. 11,050,101, herein incorporated by reference.

As illustrated in FIG. 2, the support structure 22 extends in the through plan (z-direction) between two in-plane (x-y direction) conductive surfaces/elements, namely plates 40, 42. The conductive plates 40, 42 cover the open ends of the cavities or cells 24. The conductive plates 40, 42 can each be a part of the apparatus 20, or one or both can be a part of the battery assembly, such as component walls within the heat source/battery pack including the thermal management apparatus 20 (see also FIG. 4). As an exemplary embodiment, the inner plate 40 is adjacent an outer surface of a battery pack and/or the outer plate 42 is or is adjacent to a housing wall enclosing the battery pack and the thermal management apparatus 20. The conductive plates 40, 42, or equivalent conductive elements, are desirably formed of metal, carbon, or other conductive material.

In embodiments of this invention, such as shown in the sectional view of one cavity/cell 24 in FIG. 3, the PCC 30 is configured to expand into the offset air gap 25 of the cavities or cells 24 toward the second end 28 and make contact with the conductive plate 42 upon a sufficient heat at/from the first end 26. Upon contact with the conductive plate 42, the thermal transfer is greatly increased between the plates 40, 42, from the heat source, through the PCC 30, to an outer conductive element(s) (e.g., the conductive plate 42). Each PCC cell acts independently of the surrounding cells, which can provide targeted heat transfer for hot spots in the heat source. The PCC also preferably shrinks upon subsequent cooling, allowing for reuse.

Figure 4:
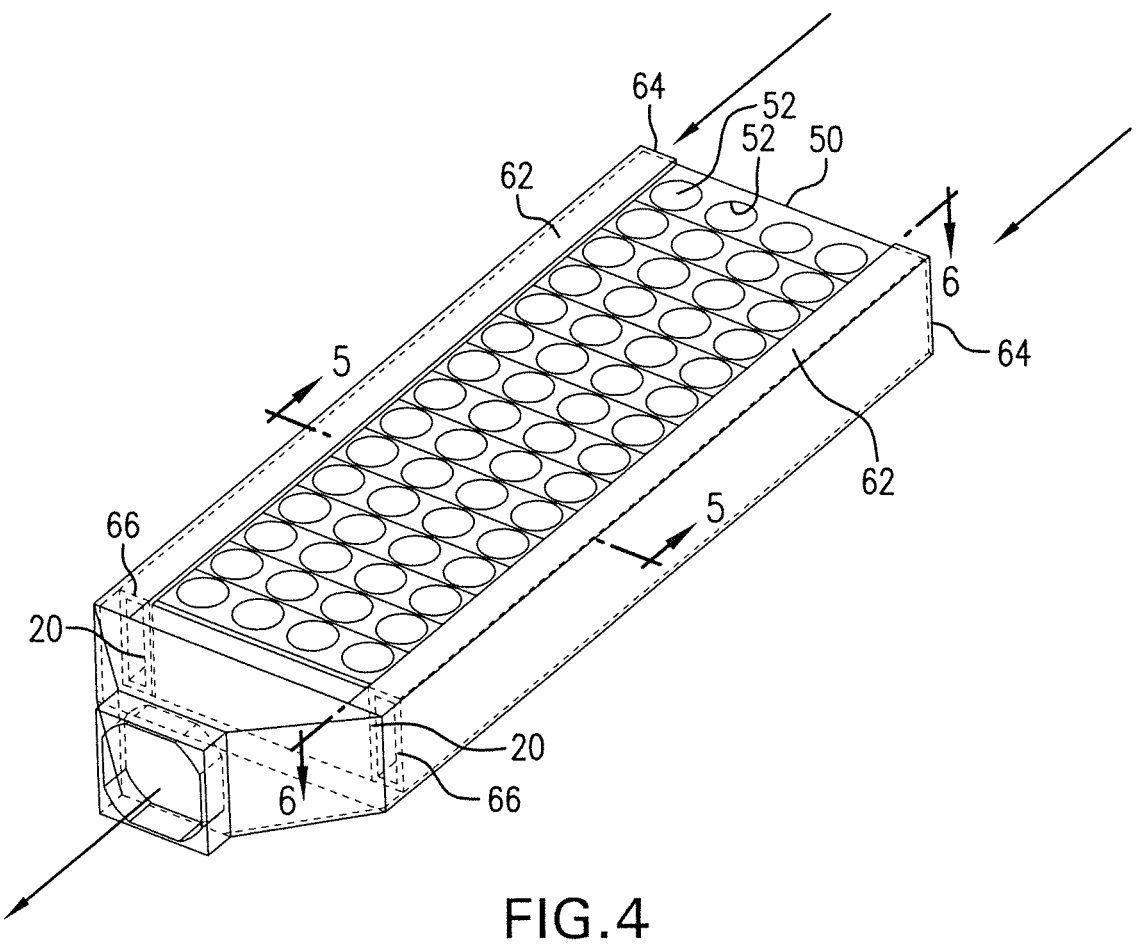
FIG. 4 shows a battery pack with a thermal management apparatus according to one embodiment of this invention.
Figure 5:
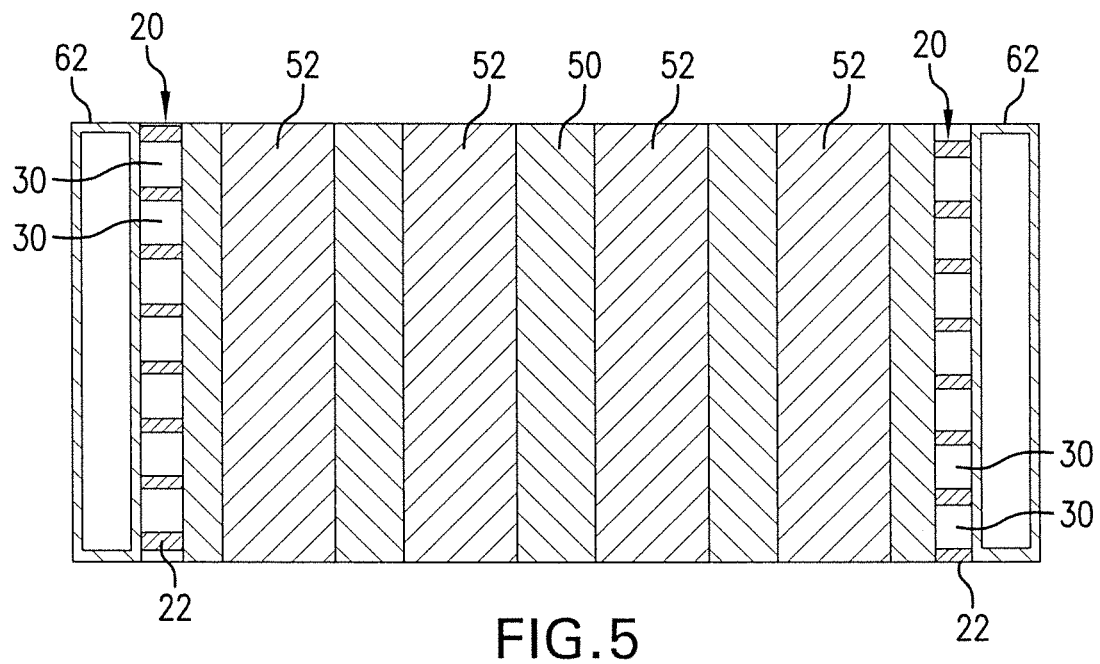
FIGS. 5 and 6 is each a sectional view of the battery pack of FIG. 4.
Figure 6:
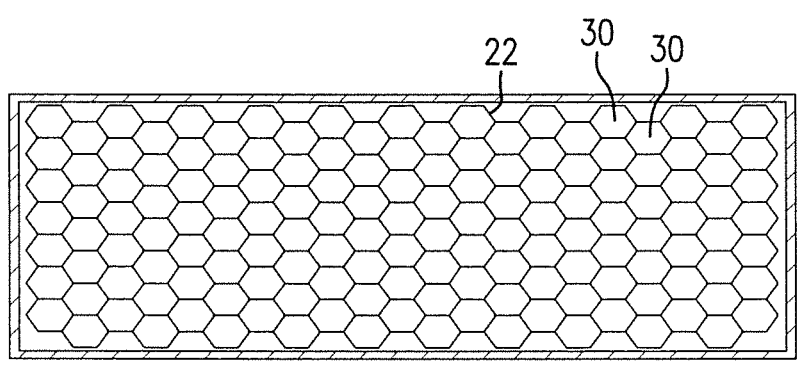
Figure 7:
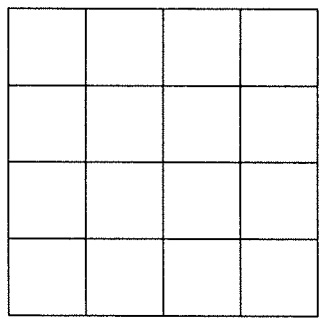
FIGS. 7 to 14 each shows an alternative support structure lattice according to embodiments of this invention.
Figure 8:
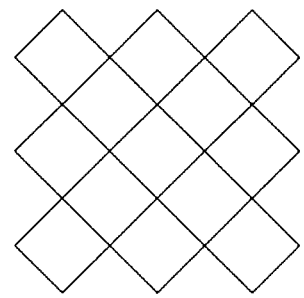
Figure 9:
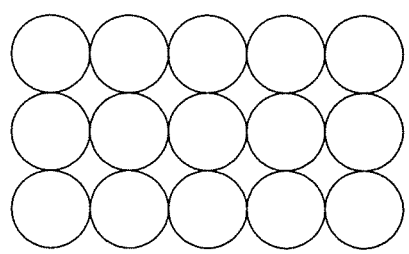
Figure 10:
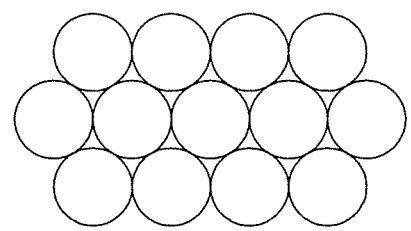
Figure 11:
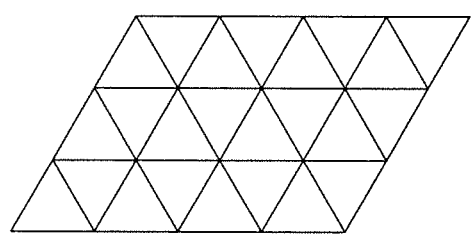
Figure 12:
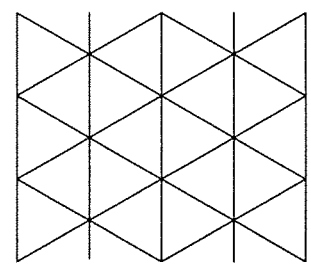
Figure 13:
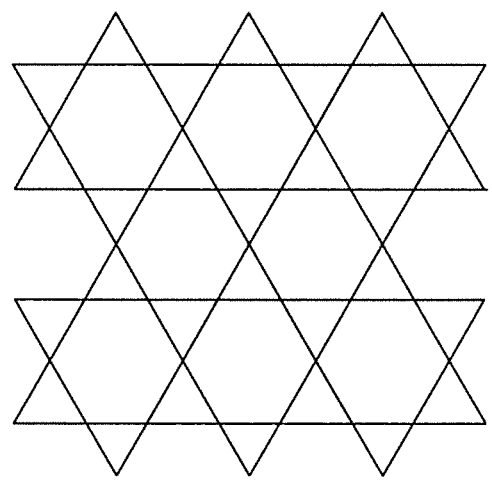
Figure 14:
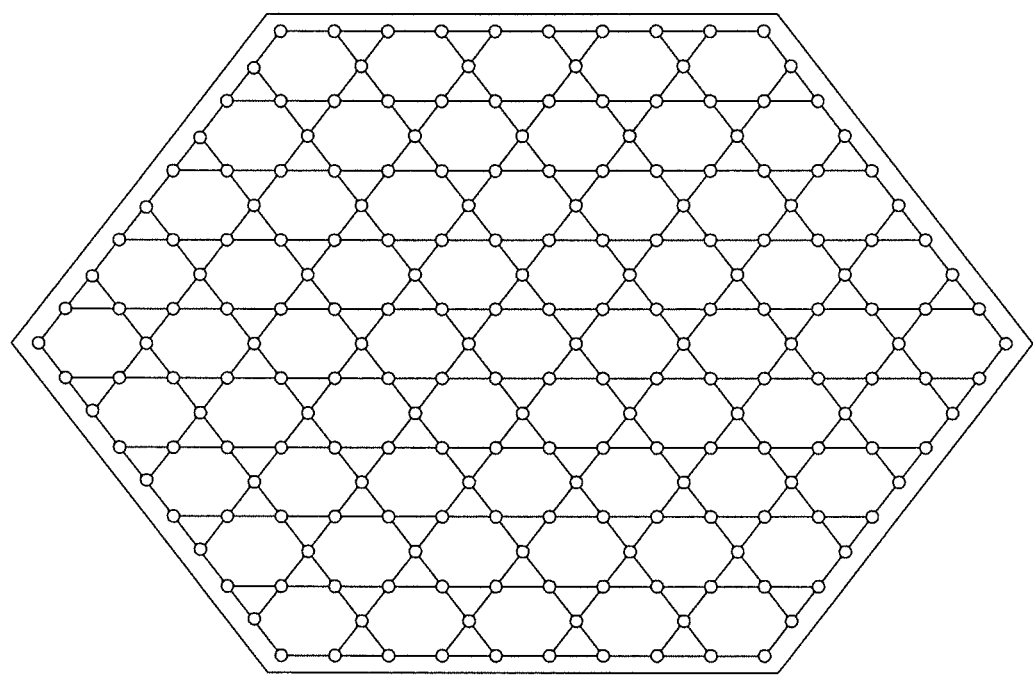

FIG. 4 illustrates a battery pack 50 of electrochemical cells 52, and having a thermal management apparatus 20 as described in FIG. 1 on each of opposing longitudinal sides. As will be appreciated, the thermal management apparatus 20 can be used on additional or alternative side surfaces of the pack 50, depending on need. Without the thermal management apparatus 20, rising heat in the battery pack 52 would continue to rise. The thermal management apparatus 20 activates upon the PCC of one or more cells reaching the outer cooling element, to greatly increase the efficiency of the thermal transfer, and reduce the temperature in the battery pack 50.

In embodiments of this invention, the thermal management apparatus 20 is disposed between the battery pack 50 and a metal enclosure or housing. As illustrated in FIG. 4, the battery pack 50 is contained within an air flow housing 60. An air flow channel 62, generally formed of a conductive material tube, is positioned on each side of the battery pack 50. Air flow (arrows) enters at one side 64 of the channels 62, and exits at an opposing second end 66. A thermal management apparatus 20 of this invention is disposed between the battery pack 50 and each air flow channel 62. The outer end of the PCC 30 within the cells or cavity of the thermal management apparatus 20 is offset from the air flow channel 62, and increases heat transfer upon swelling and thermal contact with the inner side of the corresponding channel 62. In addition, in the non-activated, offset configuration, the thermal management apparatus 20 can provide further insulation for the battery pack 50.

The thermal management apparatus of this invention can use any suitable support structure configuration. FIGS. 7-14 shows various cavity/cell shapes and configurations, including, without limitation, squares in FIGS. 7-8, circles in FIGS. 9-10, and triangles in FIGS. 11-12. The shapes can be in isotropic or orthotropic lattice configurations. The shapes can be used in any suitable combination, such the triangles and hexagons shown in FIG. 13. Different sizes, shapes, and configurations can be used on different sides of the same heat source. The lattice support structure cells on one or both sides can be filled with two or more different phase change materials or composites, such as in alternating or other patterns of phase change material, to provide a dual temperature switch, targeting areas of higher heat production. As an example, the material near a center of the battery pack can activate and expand at a lower temperature than a material near peripheral edges of the battery pack.

Figure 15:
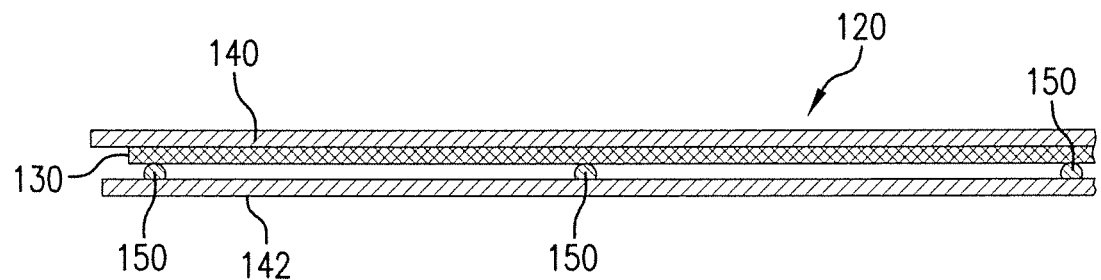
FIGS. 15 and 16 show a thermal management apparatus according to one embodiment of this invention.
Figure 16:
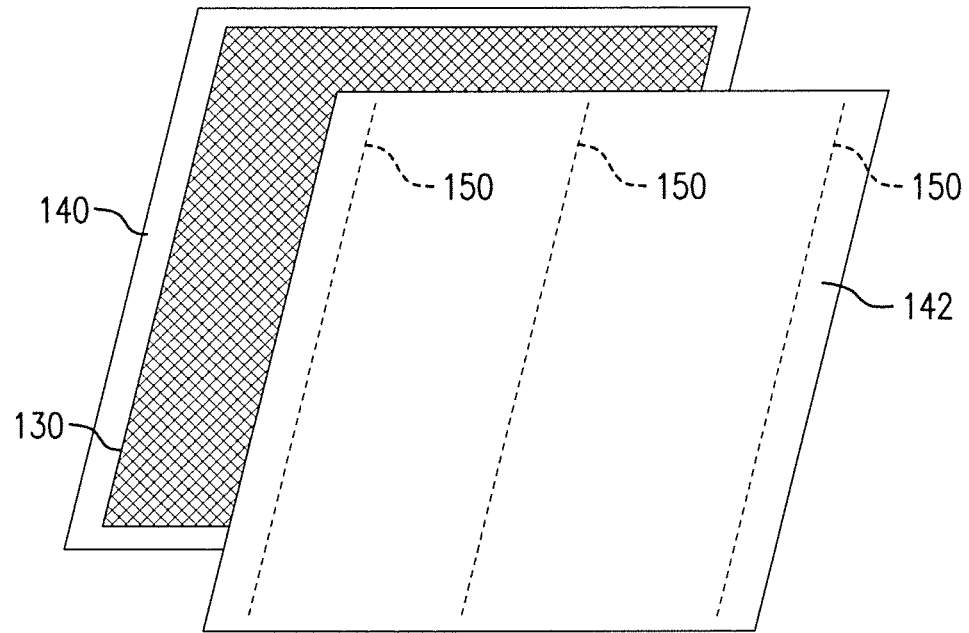

FIGS. 15 and 16 illustrate a thermal management apparatus 120 according to embodiments of this invention. In these embodiments, the temperature regulation material, again desirably a phase change composite (PCC), is formed as a sheet composite 130. The preformed PCC 130 is attached, e.g., laminated, to a first plate 140, and spaced apart from a second plate 142. Here the entire sheet 130 desirably expands toward the second plate 140 upon sufficient heat from a heat source adjacent the first plate 140. As will be appreciated, various sizes, shapes and configurations are available for the temperature regulation material composite structure of this invention, such as, for example, various cylindrical PCC forms that can be spaced along the heat source as needed.

Figure 17:
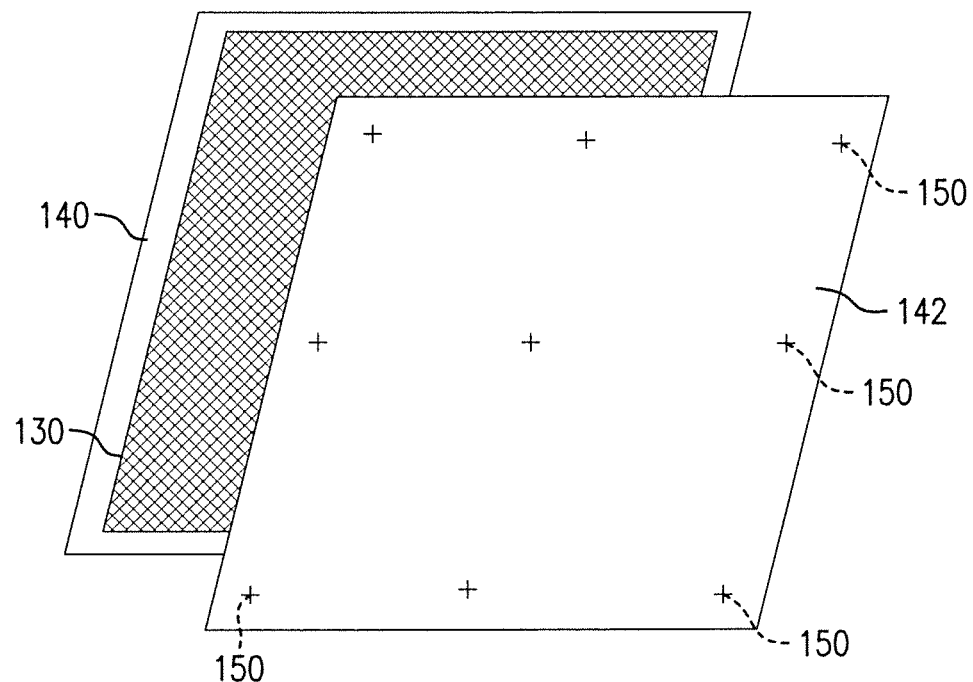
FIG. 17 shows a thermal management apparatus according to one embodiment of this invention.

FIGS. 15-17 further illustrate the use of optional stand-off spacers 150 between the PCC sheet 130 and the second plate 142. The stand-off spacers 150 may be particularly useful if the two plates 140, 142 are not otherwise fixed together, such as at ends of the plates. The side view of FIG. 15 and the exploded view of FIG. 16 show the stand-off spacers 150 as ribs extending along the second plate 142. FIG. 17 shows the shows the stand-off spacers 150 as individual points spaced apart across the second plate 140. As will be appreciated, various sizes, shapes and configurations are available for the stand-off spacers, depending on need.

The stand-off spacers 150 are desirably not thermally conductive. In embodiments of this invention, the stand-off spacers 150 are made of a hard/fixed material, which the PCC 130 expands around to make contact with the second plate 142. In another embodiment of this invention, the stand-off spacers 150 are made of a compressible material (foam, rubber, etc.) which collapses under pressure to allow PCC 130 to expand and contact the second plate 142. In another embodiment of this invention, the stand-off spacers 150 are mounted in a recessed channel with a spring, which allows the spring to compress and the stand-off to 'sink' into the recessed channel, thus allowing the PCC to expand and contact the second plate.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Figure 18:
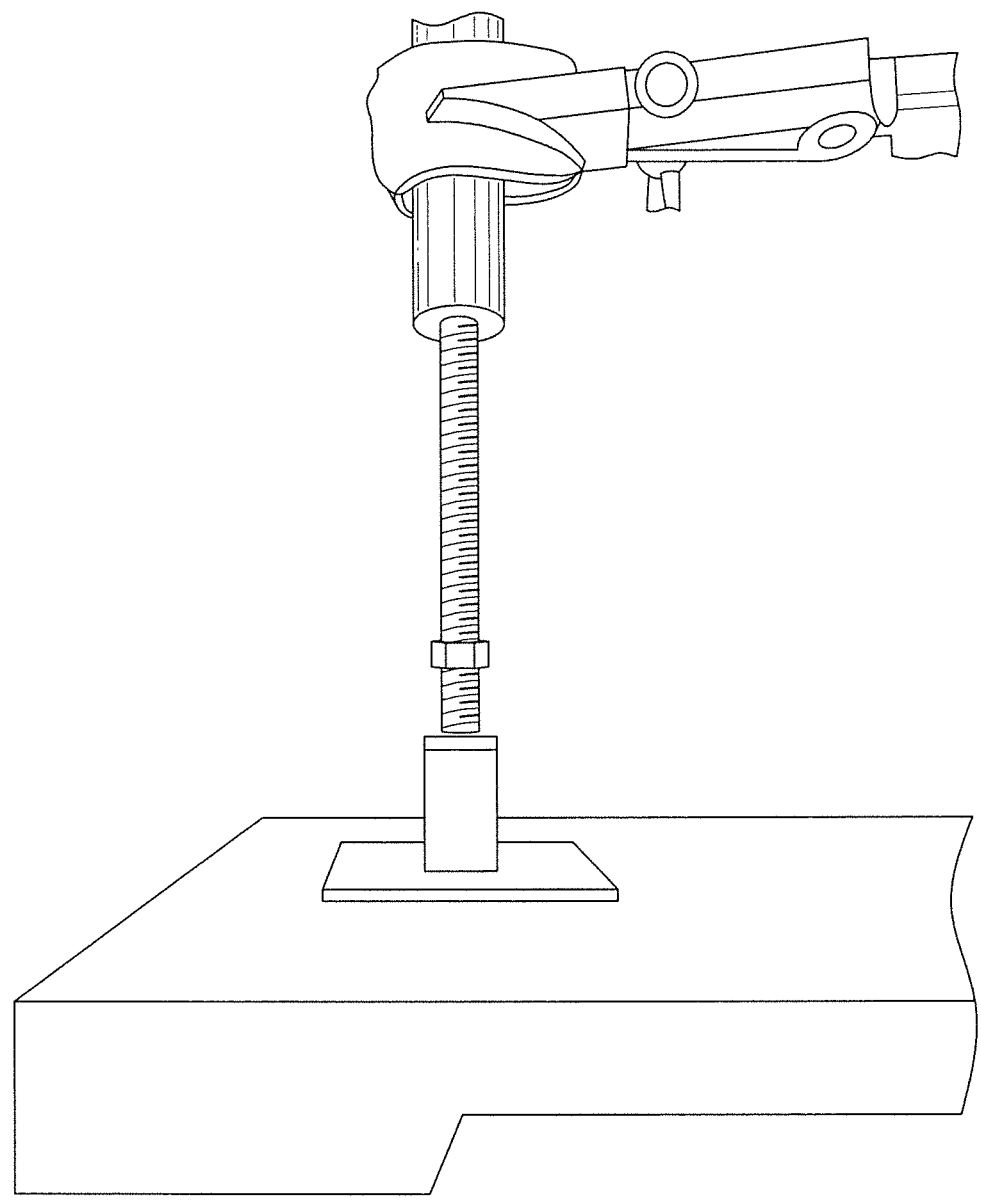
FIG. 18 shows an experimental setup for testing expansion of a thermally responsive material according to an embodiment of this invention.

FIG. 18 shows a PCC example used to demonstrate exemplary thermal expansion capabilities of the materials of this invention. The table below summarizes the PCC material shown, which was formed of wax-impregnated graphite material. The measurement of the thermal expansion of this PCC by LVDT was performed according to ASTM E228.

| Specification | Unit | Detail | PCC55-1000 |
|---|---|---|---|
| Melting Point | ° C. | | 55 |
| Melting Range | ° C. | | 48-57 |
| Density | kg/m³ | Room Temperature (RT) | 875 |
| Thermal Expansion - Solid Phase | %/° C. | Measured from RT to Melting Onset | 0.146 |
| Thermal Expansion - During Melting | %/° C. | Measured During Melting | 0.494 |
| Thermal Expansion - Liquid Phase | %/° C. | Measured After Melting to 75° C. | 0.075 |

Figure 19:
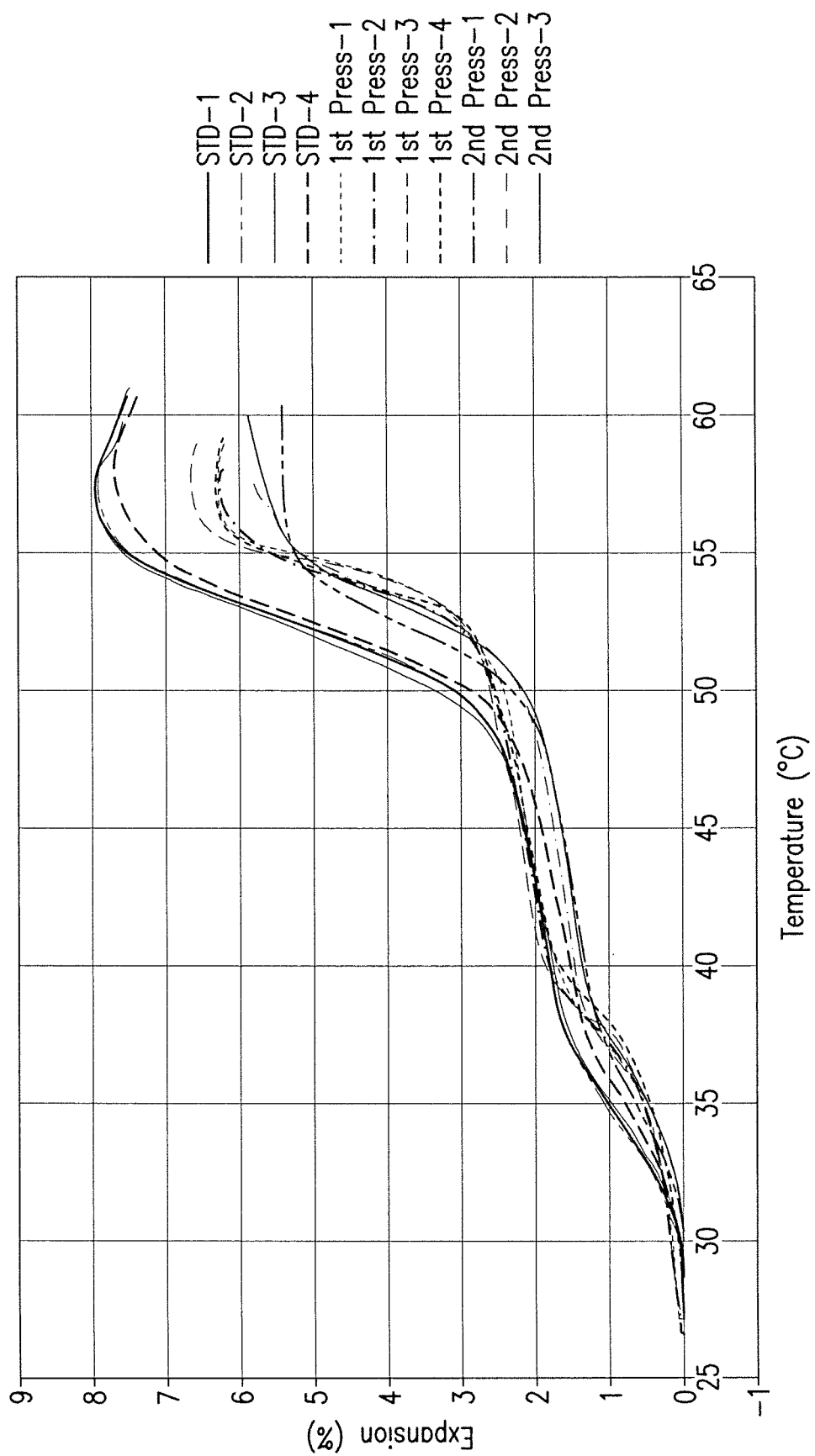
FIGS. 19-22 are graphs summarizing example testing results.
Figure 20:
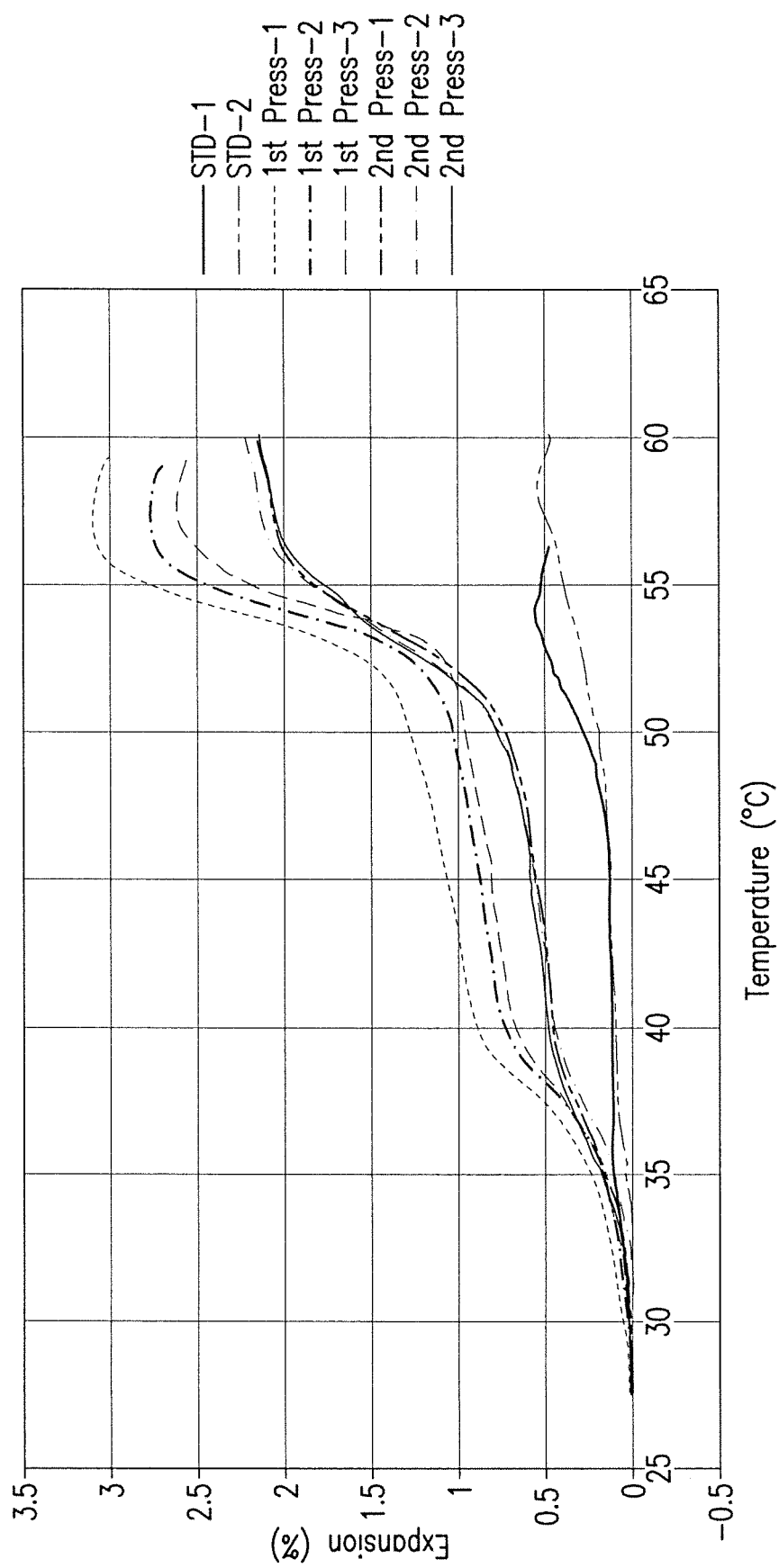
Figure 21:
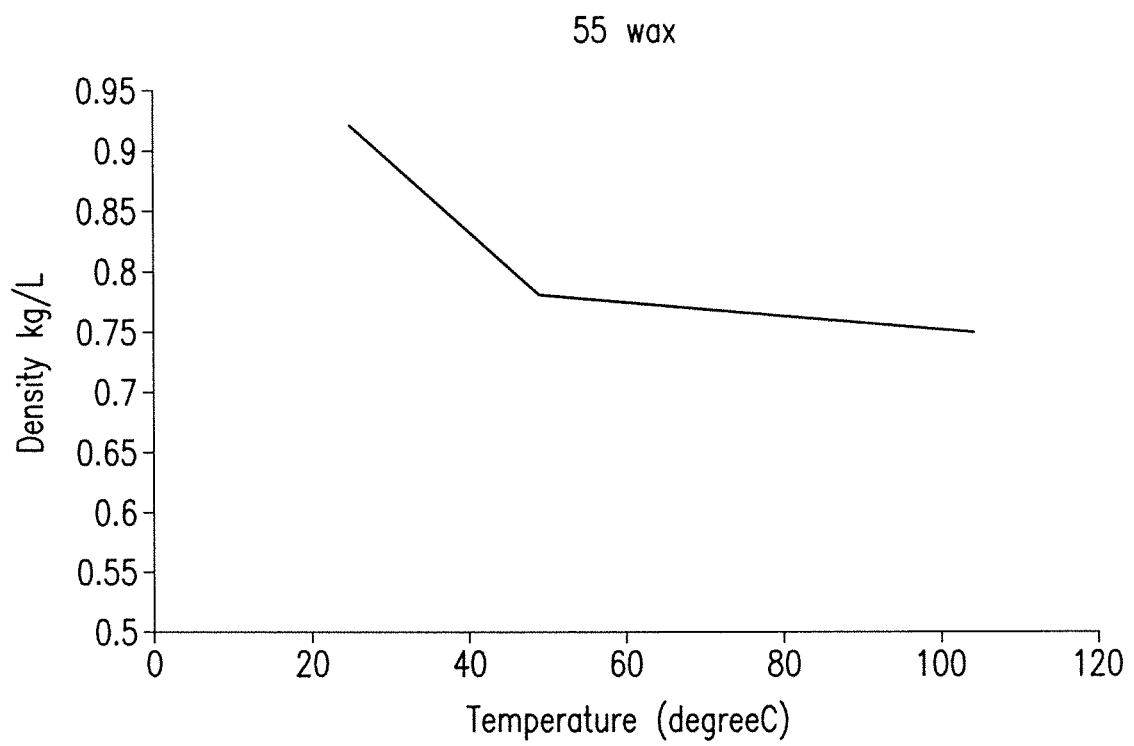
Figure 22:
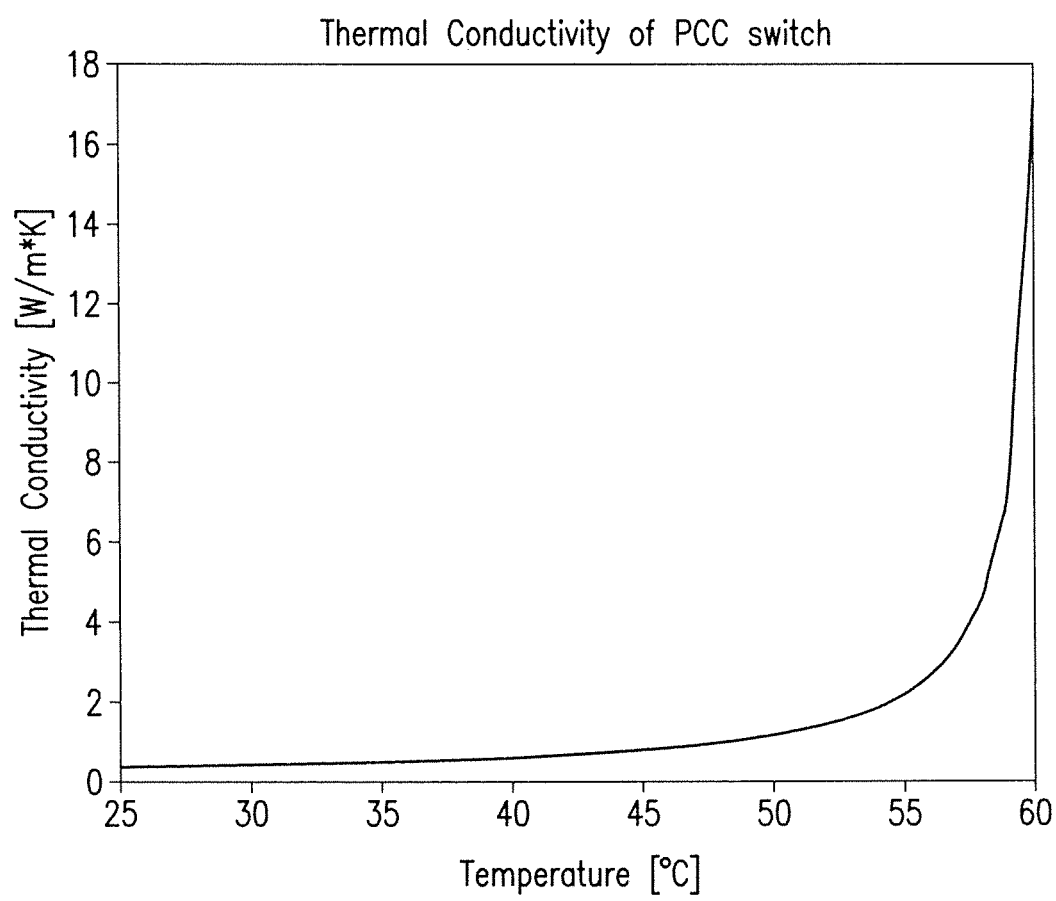

FIGS. 19 and 20 summarize the thermal expansion in the through plane ("z-direction", FIG. 19) and the in-plane ("x-y direction", FIG. 20) directions, for a number of samples of the material above, including additional presses of the scrap material of the test to demonstrate an ability to recycle the material. FIG. 21 is a graph of a density change of a sample at rising temperature. FIG. 22 shows a thermal conductivity of a sample switch at various temperatures, where bridging the air gap occurs at the time of the rapidly increased conductivity (at and after the PCM melting point of 55° C.). Each of FIGS. 19-22 shows the increased expansion of the PCC material at the melting point and its benefit to thermal conductivity, thereby demonstrating the use as an expandable switch according to this invention. The switch of this invention having a particular melting point can be matched to a defined overheat point of a heat source to greatly increase the thermal energy transfer from the heat source.

Thus, the invention provides a passive thermal transfer 'switch' for thermal management of battery packs or other installations.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:
1. A thermal management apparatus, comprising:
   a support structure disposed between two surfaces, the support structure having a lattice or honeycomb array of a plurality of cavities or cells each extending between a first side of the support structure and a second side of the support structure, wherein the first side of the support structure is disposed against a first of the two surfaces, and the second side of the support structure is disposed against a second of the two surfaces;
   a preformed thermally responsive phase change composite disposed in each of the plurality of cavities or cells, wherein the phase change composite in each of the plurality of cavities or cells is in contact with the second of the two surfaces and is offset from and not in contact with the first side of the support structure and the first of the two surface, the entire phase change composite expands upon heating to contact the first of the two surfaces and connect the two surfaces for increasing a thermal conductance between the two surfaces, the phase change composite shrinks upon subsequent cooling to reform the offset, the phase change composite is thermally insulating when not in an expanded state, and the phase change composite is formed of a phase change material intermixed and secured within a graphite block matrix material.

2. The apparatus of claim 1, wherein the second of the two surfaces is or is disposed adjacent to a heat source.

3. The apparatus of claim 1, wherein both the matrix material and the phase change material move within the plurality of cavities or cells while the phase change composite expands.

4. The apparatus of claim 1, wherein the phase change material is selected from a paraffin wax, a hydrated salt, and combinations thereof.

5. The apparatus of claim 1, wherein the phase change material is selected from a paraffin wax, a hydrated salt, and combinations thereof, and both the graphite and the phase change material move within the plurality of cavities or cells while the phase change composite expands.

6. The apparatus of claim 1, further comprising a predetermined air gap between the phase change composite and both the first side of the support structure and the first of the two surface, before the entire phase change composite expands.

7. The apparatus of claim 6, wherein the second of the two surfaces is or is disposed adjacent to a heat source, and the phase change composite expands to close the air gap and thermally connect the two surfaces, thereby increasing thermal conductivity for moving thermal energy from the heat source to the first of the two surfaces.

8. The apparatus of claim 1, wherein the phase change composite is offset from the first side a predetermined distance, and the phase change composite expands to reach the first of the two surfaces upon a sufficient thermal change in the heat source.

9. The apparatus of claim 1, wherein the two surfaces comprise parallel, in-plane (x-y direction) conductive surfaces or elements, the support structure extends in a through plan (z-direction) between the two surfaces, and the conductive surfaces or elements cover open ends of the plurality of cavities or cells.

10. The apparatus of claim 1, wherein the preformed thermally responsive phase change composite of each of the plurality of cavities or cells expands independently of the preformed thermally responsive phase change composite of surrounding cavities or cells, thereby providing targeted heat transfer for hot spots in a heat source of or adjacent to the second of the two surfaces.

11. The apparatus of claim 1, wherein the plurality of cavities or cells includes a cross-sectional cavity or cell shape selected from a circle, a square, a triangle, a hexagon, and combinations thereof.

12. The apparatus of claim 1, wherein the phase change composite changes from thermally insulating to thermally conductive upon the heating and expanding.

13. The apparatus of claim 1, wherein each of the two surfaces comprises a thermally conductive plate.

14. The apparatus of claim 1, wherein the second of the two surfaces is or is disposed adjacent to a battery pack includes a plurality of electrochemical cells.

15. The apparatus of claim 1, wherein the first of the two surfaces is a conductive surface adjacent an outer housing wall for a heat source or a cooling channel.

16. The apparatus of claim 1, further comprising an air flow housing for a battery pack, the air flow housing including an air flow channel, wherein the support structure is disposed between the battery pack and the air flow channel, and the first of the two surfaces is or is disposed adjacent the air flow channel.

17. The apparatus of claim 1, wherein the graphite block matrix material has a matrix shape corresponding to a shape of one of the cells or cavities.

* * * * *